US010219315B2

(12) United States Patent
Cesares Cano et al.

(10) Patent No.: US 10,219,315 B2
(45) Date of Patent: Feb. 26, 2019

(54) METHOD FOR POWER MANAGEMENT AND POWER MANAGEMENT CONTROLLER FOR A RADIO RECEIVER

(71) Applicant: Intel IP Corporation, Santa Clara, CA (US)

(72) Inventors: Jose A. Cesares Cano, Dresden (DE); Zijian Bai, Neubiberg (DE); Gary Chang, Santa Clara, CA (US); Matthias Obermeier, Taufkirchen (DE); Mathias Kurth, Dresden (DE); Ismael Gutierrez, San Jose, CA (US); Sven Dortmund, Essen (DE)

(73) Assignee: Intel IP Corporation, Santa Clara, CA (US)

( * ) Notice: Subject to any disclaimer, the term of this patent is extended or adjusted under 35 U.S.C. 154(b) by 75 days.

(21) Appl. No.: 15/352,896

(22) Filed: Nov. 16, 2016

(65) Prior Publication Data

US 2017/0181219 A1    Jun. 22, 2017

(30) Foreign Application Priority Data

Dec. 16, 2015    (DE) .................. 10 2015 121 994

(51) Int. Cl.
*H04B 17/336*    (2015.01)
*H04W 52/02*    (2009.01)
(Continued)

(52) U.S. Cl.
CPC .......... *H04W 76/28* (2018.02); *H04B 17/336* (2015.01); *H04W 52/0216* (2013.01);
(Continued)

(58) Field of Classification Search
CPC .......... H04B 17/336; H04W 52/0216; H04W 76/28; H04W 76/048; H04W 72/042
See application file for complete search history.

(56) References Cited

U.S. PATENT DOCUMENTS 7,733,827 B2 *   6/2010   Kim ................... H04L 5/0091
                                                    370/328
9,425,939 B2 *   8/2016   Park ....................... H04L 5/005
(Continued)

FOREIGN PATENT DOCUMENTS

WO    WO-2014137067 A1    9/2014

OTHER PUBLICATIONS

German Patent Office, Office Action issued for DE10 2015 121 994.8, 7 pages, dated Jul. 29, 2016.

*Primary Examiner* — Yemane Mesfin
*Assistant Examiner* — Henry Baron
(74) *Attorney, Agent, or Firm* — Schiff Hardin LLP

(57) ABSTRACT

A method (200) for power management in a radio receiver includes: receiving (201) a sequence of radio subframes over a radio channel, each radio subframe comprising at least one control region and at least one data region; monitoring (202) control information from at least one control region of at least one radio subframe; generating (203) a channel metric based on the monitored control information, the channel metric indicating a quality of the radio channel; and selecting (204) a control region decoding mode based on the channel metric, the control region decoding mode indicating a scheduling for disabling reception of at least part of the at least one data region of the sequence of radio subframes.

24 Claims, 7 Drawing Sheets

(51) Int. Cl.
*H04W 72/04* (2009.01)
*H04W 76/28* (2018.01)

(52) U.S. Cl.
CPC ....... *H04W 72/042* (2013.01); *Y02D 70/1262* (2018.01); *Y02D 70/1264* (2018.01); *Y02D 70/23* (2018.01); *Y02D 70/24* (2018.01)

(56) References Cited

U.S. PATENT DOCUMENTS

| | | |
|---|---|---|
| 2013/0237171 A1 | 9/2013 | Lindoff et al. |
| 2014/0056194 A1 | 2/2014 | Olsson et al. |
| 2015/0082133 A1* | 3/2015 | Cao .................... G06F 11/1004 714/807 |

* cited by examiner

METHOD FOR POWER MANAGEMENT AND POWER MANAGEMENT CONTROLLER FOR A RADIO RECEIVER

FIELD

The disclosure relates to a method for power management in a radio receiver, in particular management of different control region decoding modes of a mobile communication standard such as LTE (Long Term Evolution) with variant power-saving capabilities. The disclosure further relates to a power management controller for a radio receiver and a radio receiver including a power management controller

BACKGROUND

In a radio communication system 100, e.g. as illustrated in FIG. 1 communication 101 is exchanged between a radio cell 110 and a mobile station (or mobile device) 120. The mobile station 120 analyzes the use case and applies a strategy to minimize the power consumption. A power up command 102 may signal the mobile station 120 to change in normal power mode while a power down command 104 may signal the mobile station 120 to change in power saving mode. However, activation of such a power control reduces the reception performance, e.g. reception of the Physical Downlink Control Channel (PDCCH) for an LTE system. Under poor wireless channel conditions, this can degrade the data throughput as well as cause the loss of the connection to the radio cell 110, e.g. the serving eNodeB. There is a need to improve power control in the mobile device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
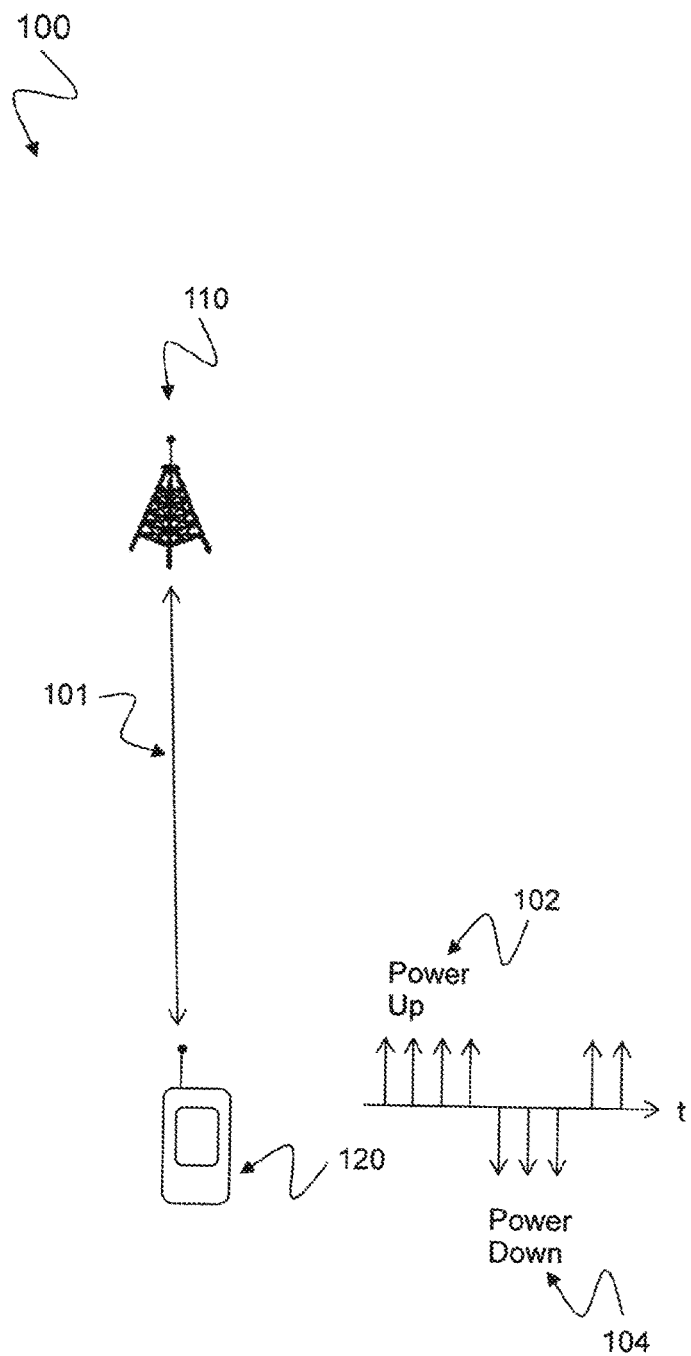
FIG. 1 is a schematic diagram illustrating a radio communication system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
RB: Resource Block, e.g., a resource block in frequency direction times slot in time direction,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: Signal-to-interference and noise ratio,
OFDM: Orthogonal Frequency Division Multiplex, eNB,
eNodeB: Base station,
(e)ICIC: (enhanced) Inter-Cell Interference Coordination,
MIMO: Multiple Input Multiple Output,
CE: Channel Estimation,
HARQ: Hybrid Automatic Repeat Request,
PDCCH: Physical Downlink Control Channel,
DL: Downlink,
BW: Bandwidth,
DCI: Downlink Control Information,
PDSCH: Physical Downlink Shared Channel,
CA Carrier aggregation,
DRX: Discontinuous receive,
CDRX: Connected mode DRX.

The methods and devices described herein may be based on power management and power saving circuits in mobile devices and radio receivers, in particular LTE radio receivers. In the following description an early control region decoding mode inhering a first power saving mode is also referred to as "early_PDCCH" as exemplary described below with respect to FIG. 6 and a control region only decoding mode inhering a second power saving mode is also referred to as "PDCCH_only" as exemplary described below with respect to FIG. 7 while a normal power mode is exemplary described below with respect to FIG. 5.

It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves. Mobile devices as described herein may include a radio receiver and/or a radio transmitter.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

Figure 4:
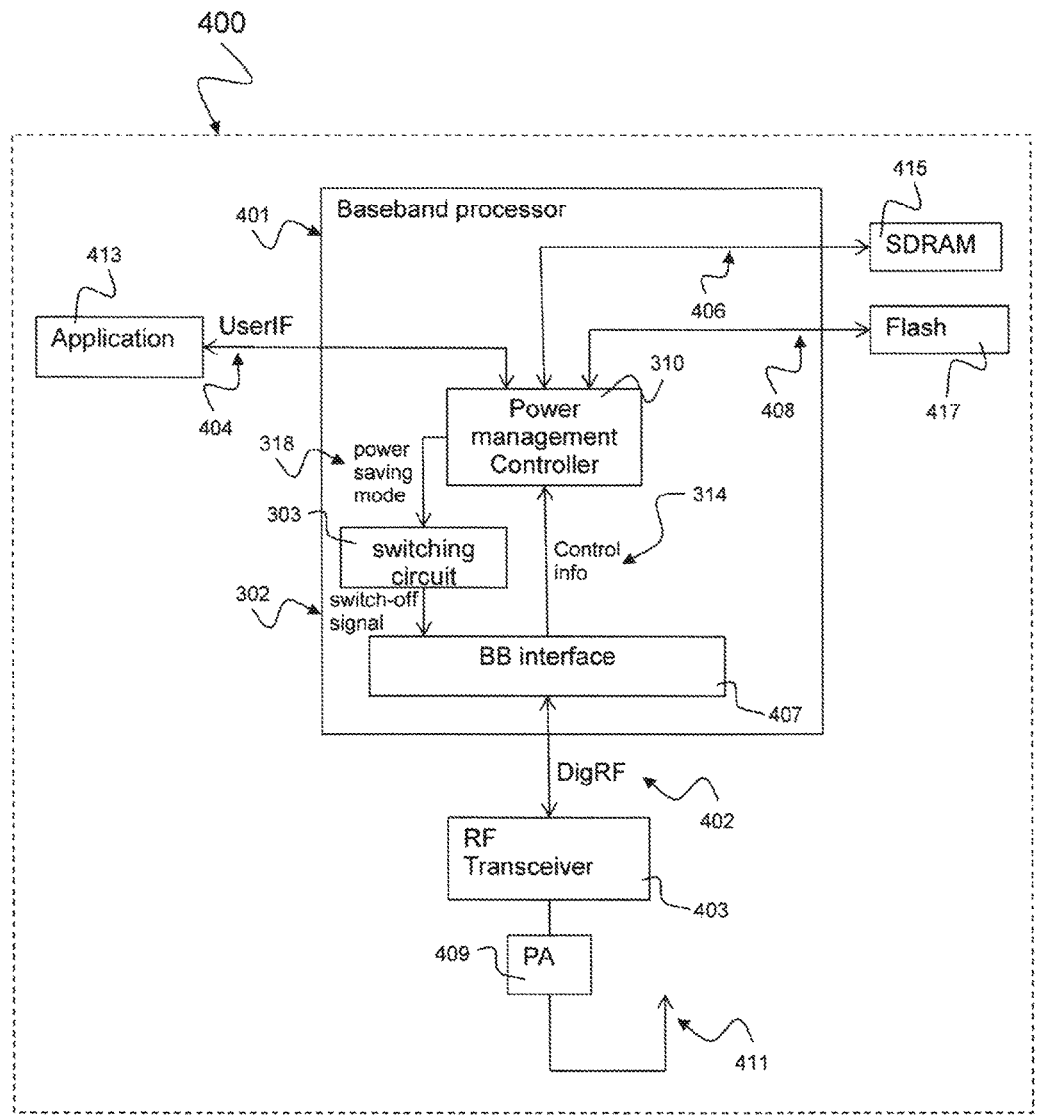
FIG. 4 schematically illustrates an exemplary mobile device 400 including a baseband processor chip 401 and a RF transceiver chip 403 and further components.
Figure 5:
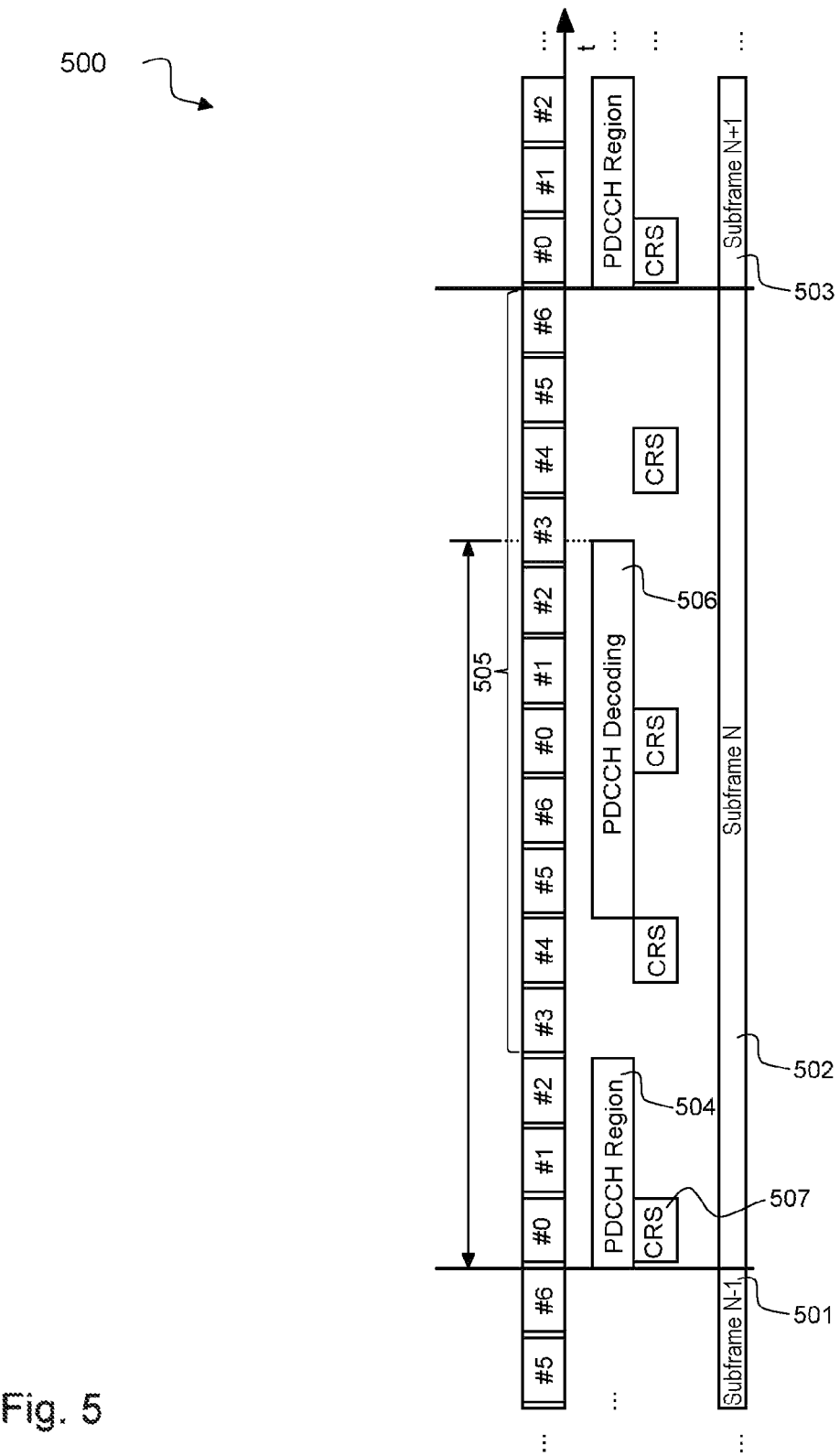
FIG. 5 illustrates a timing diagram of a normal power mode 500 applied to an LTE subframe 502.

Methods and devices according to the disclosure may be configured to receive radio subframes, in particular LTE subframes according to the timing diagram of a basic LTE subframe 502 as depicted in FIG. 5. The LTE subframe 502 may be received as a radio subframe by the methods and devices as described below with respect to FIGS. 2 to 4. The LTE subframe 505 may be received by the receiver circuit 301 as described below with respect to FIG. 3 or the RF transceiver 403 as described below with respect to FIG. 4.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may apply modes or states of a radio receiver, e.g. the RRC_CONNECTED mode which corresponds to RRC_CONNECTED state as described in 3GPP TS 36.133 version 12.7.0 "Evolved Universal Terrestrial Radio Access (E-UTRA); Requirements for support of radio resource management".

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes.

The methods and devices described hereinafter may be applied in Carrier Aggregation systems. Carrier Aggregation systems may enable an LTE-A UE to connect to several downlink component carriers simultaneously. It not only may allow resource allocation across component carriers, it also may allow scheduler based fast switching between component carriers without time consuming handover.

The methods and devices described hereinafter may be applied in MIMO systems and diversity receivers. Multiple-input multiple-output (MIMO) wireless communication systems employ multiple antennas at the transmitter and/or at the receiver to increase system capacity, to improve the reliability of a radio link and therefore to achieve better quality of service. In spatial multiplexing mode, MIMO systems may reach higher peak data rates without increasing the bandwidth of the system by transmitting multiple data streams in parallel in the same frequency band. In diversity mode, MIMO systems may use two or more antennas at both transmitter and receiver sides to improve the quality and reliability of a radio link. In hybride mode, MIMO systems may achieve both peak data rate increment and radio link reliability improvement simultaneously by combining processing in the spatial multiplexing and diversity mode.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustrating various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
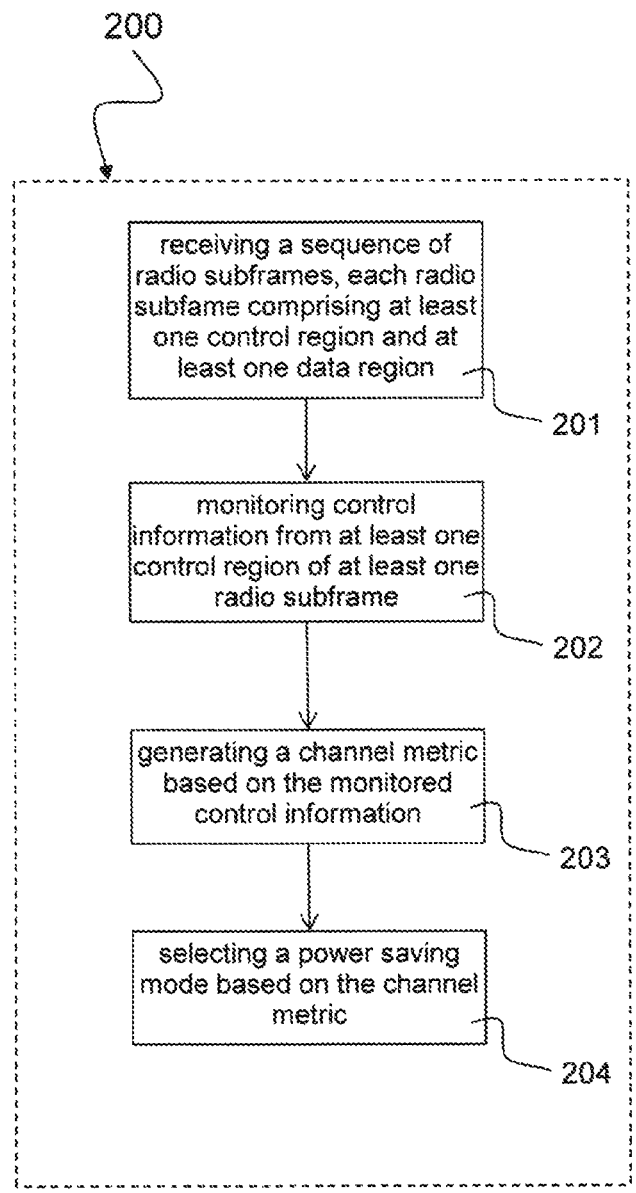
FIG. 2 schematically illustrates an exemplary method 200 for power management in a radio receiver.

FIG. 2 schematically illustrates an exemplary method 200 for power management in a radio receiver.

The method 200 includes receiving 201 a sequence of radio subframes, e.g. radio subframes 501, 502, 503 as described below with respect to FIGS. 5 to 7 over a radio channel. Each radio subframe 502 includes at least one control region 504 and at least one data region 505. The method 200 includes: monitoring 202 control information from at least one control region 504 of at least one radio subframe 502. The method 200 includes: generating 203 a channel metric based on the monitored control information. The channel metric indicates a quality of the radio channel. The method 200 includes: selecting 204 a control region decoding mode, e.g. the early control region decoding mode inhering the first power saving mode 600 as described below with respect to FIG. 6 or the control region only decoding mode inhering the second power saving mode 700 as described below with respect to FIG. 7, based on the channel metric. The control region decoding mode inhering the power saving mode 600, 700 indicates a scheduling for disabling reception of at least part of the at least one data region of the sequence of radio subframes to reduce power consumption, as described below with respect to FIGS. 6 and 7. The selecting 204 refers to the control region decoding mode. The power saving is the capability or the property of the given control region decoding mode.

The method 200 may further include: disabling reception of 201 at least part of the at least one data region 505 of the sequence of radio subframes 501, 502, 503 according to the selected control region decoding mode 600, 700.

Figure 6:
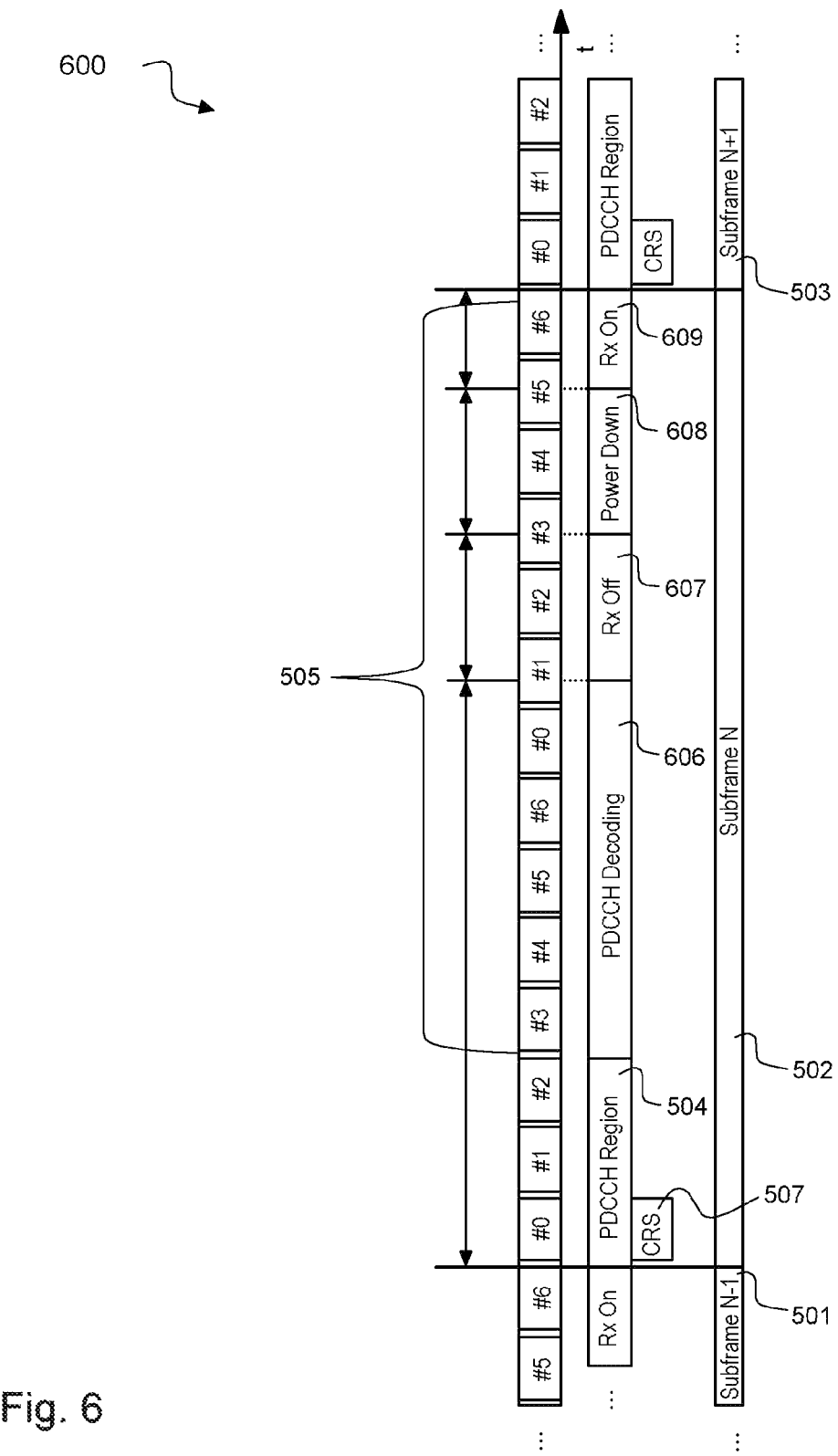
FIG. 6 illustrates a timing diagram of an early control region decoding mode inhering the first power saving mode 600 applied to an LTE subframe 502.
Figure 7:
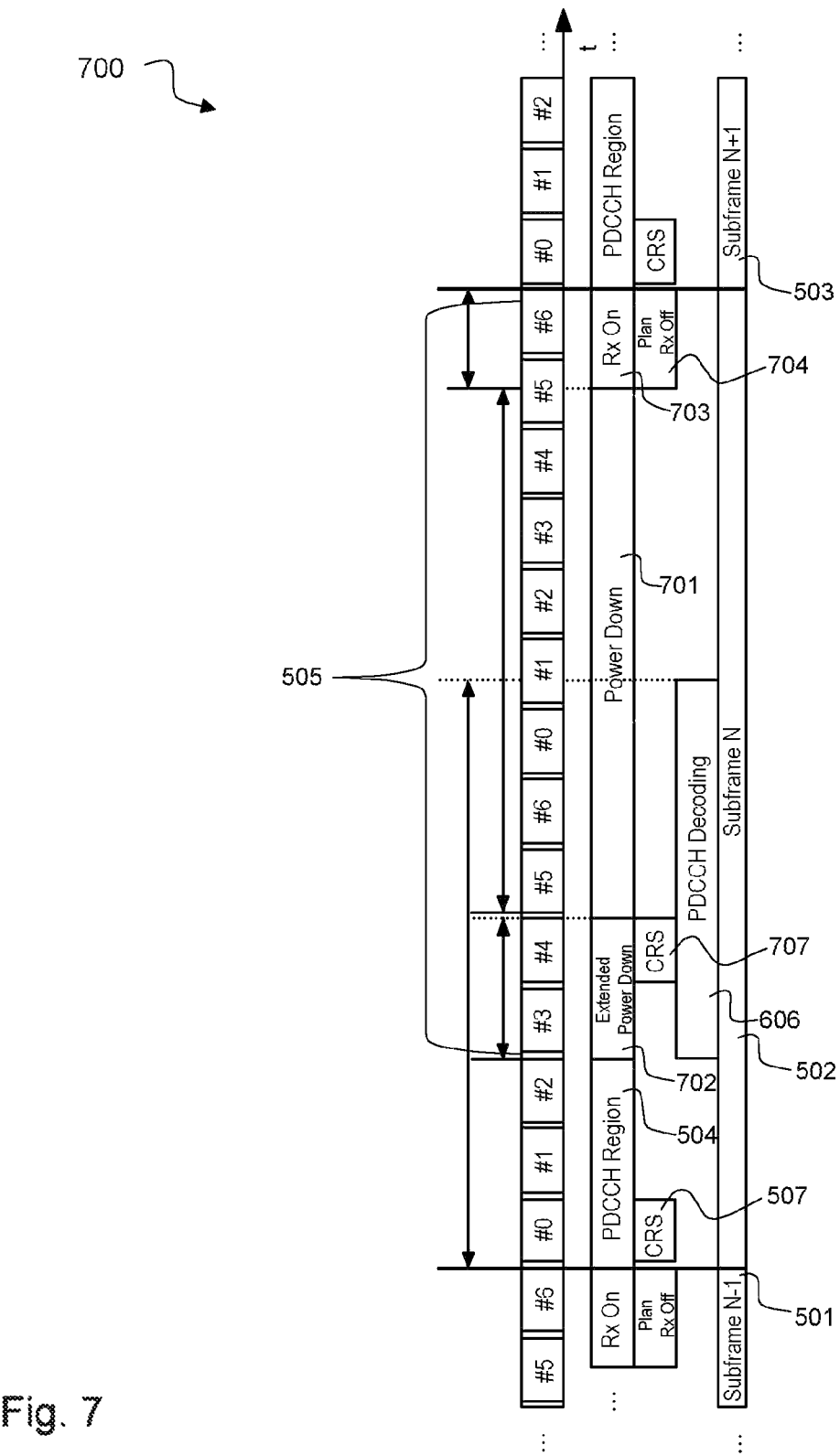
FIG. 7 illustrates a timing diagram of a control region only decoding mode inhering the second power saving mode 700 applied to an LTE subframe 502.

The method 200 may further include: generating 203 the channel metric based on at least one cell specific reference symbol, e.g. the CRS 507 depicted in FIGS. 5 to 7, received in at least one control region 504 of at least one radio subframe 502.

A first control region decoding mode, e.g. early control region decoding mode 600 as described below with respect to FIG. 6, may indicate a scheduling for disabling reception of the at least one data region 505 after decoding 606 at least part of the at least one control region 504.

A second control region decoding mode, e.g. PDCCH_only 700 as described below with respect to FIG. 7, may indicate a scheduling for disabling reception of the at least one data region before a knowledge from the control information indicating an absence or presence of user data in the at least one data region 505. It is a cross-subframe scheduling, meaning that if absence of user data is found in the control information in 502, then scheduling for disabling reception of data region in 503 is indicated.

A normal control region decoding mode, e.g. normal_PDCCH 500 as described below with respect to FIG. 5, may indicate a scheduling for a normal operation in which receiving the at least one data region 505 and the at least one control region is enabled.

The method 200 may further include: assigning respective priorities to the control region decoding modes. A priority assigned to the second control region decoding mode PDCCH_only 700 may be higher than a priority assigned to the first control region decoding mode early_PDCCH 600 and the priority assigned to the first control region decoding mode early_PDCCH 600 may be higher than a priority of the normal control region decoding mode normal_PDCCH 500.

The method 200 may further include: generating the channel metric based on a signal to interference plus noise ratio.

The method 200 may further include: selecting the first control region decoding mode early_PDCCH 600 if the following conditions are met: the radio receiver is in continuous reception mode, the radio receiver enters RRC_CONNECTED mode, and the signal to interference plus noise ratio is above a first threshold, e.g. earlyPdcch_SinrHigh as described below, for a first threshold number, e.g. earlyPdcch_evaluationTime as described below, of successive radio subframes of the sequence of radio subframes 501, 502, 503.

The method 200 may further include: maintaining the first control region decoding mode early_PDCCH 600 if the radio receiver enters a connected discontinuous reception (C-DRX) state in RRC_CONNECTED mode and if the signal to interference plus noise ratio is above the first threshold earlyPdcch_SinrHigh.

The method 200 may further include: scheduling a transition from the first control region decoding mode early_PDCCH 600 to the normal control region decoding mode normal_PDCCH 500 if the signal to interference plus noise ratio is below a second threshold, e.g. earlyPdcch_SinrLow as described below, for the first threshold number, e.g. earlyPdcch_evaluationTime as described below, of successive radio subframes of the sequence of radio subframes 501, 502, 503 or if the radio receiver leaves the RRC_CONNECTED mode.

The method 200 may further include: selecting the second control region decoding mode PDCCH_only 700 if the following conditions are met: the radio receiver is in continuous reception mode, the radio receiver enters RRC_CONNECTED mode, and the signal to interference plus noise ratio is above a third threshold, e.g. pdcchOnly_SinrHigh as described below, for a second threshold number, e.g. pdcchOnly_evaluationTime as described below, of successive radio subframes of the sequence of radio subframes 501, 502, 503.

The method 200 may further include: selecting the second control region decoding mode PDCCH_only 700 if the following further condition is met: after a third threshold number, e.g. pdcchOnly_subframes as described below, of successive radio subframes no downlink assignments are addressed to the radio receiver.

The method 200 may further include: selecting the second control region decoding mode PDCCH_only 700 if the following further condition is met: after the third threshold number pdcchOnly_subframes of successive radio subframes no downlink hybrid automatic repeat request (HARQ) process is pending in the radio receiver. The method 200 may further include: selecting the second control region decoding mode PDCCH_only 700 when the conditions defined in this and the above two paragraphs are met simultaneously.

The method 200 may further include: scheduling a transition from the second control region decoding mode PDCCH_only 700 to the normal control region decoding mode normal_PDCCH 500 if the signal to interference plus noise ratio is below a fourth threshold, e.g. Pdcch_Only as described below, for the second threshold number PdcchOnly_evaluationTime of successive radio subframes of the sequence of radio subframes 501, 502, 503 or if the radio receiver leaves the RRC_CONNECTED mode or if a downlink assignment is addressed to the radio receiver.

The method 200 may further include: generating the radio channel metric based on a block error rate (BLER) of the received sequence of radio subframes 501, 502, 503. The method 200 may further include: generating the BLER based on one of exponential effective SNR mapping (EESM) or mutual information effective SNR mapping (MIESM).

In the following paragraphs, a basic algorithm is described as one example of the method 200 described above. The basic algorithm is related to PDCCH decoding mode management based on SINR.

SINR has been selected as DL radio channel metric to introduce the basic algorithm, which allows to indicate the PDCCH decoding performance in terms of PDCCH decoding error probability. Furthermore, the PDCCH decoding performance is a monotonic function of SINR. In order to maintain a stable system connection, e.g. PDCCH decoding error probability below 1%, different control region decoding modes such as PDCCH decoding modes inhering different power saving capabilities may require different SINR thresholds. Hence SINR can be utilized as the DL radio channel metric to manage or select the proper PDCCH decoding mode to achieve the desired power saving benefit by the management of PDCCH decoding modes.

As receiver antenna specific SINRs is a common metric being measured or computed for the purpose of data reception, an effective SINR based on these available SINRs for the management of PDCCH decoding mode can follow a low cost implementation approach, e.g. look up table or simple arithmetic operation. Based on the computed effective SINR and the predefined or adaptive SINR thresholds of different PDCCH decoding modes, the management of the PDCCH decoding modes is applicable.

Note that when defining the C-DRX rules, the terminology specified in the standardization document 3GPP TS 36.211 version 12.4.0 "Evolved Universal Terrestrial Radio Access (E-UTRA); Physical channels and modulation" has been used. Note that C-DRX refers to DRX operation in RRC_CONNECTED mode.

A)—Early PDCCH Evaluation Criteria in Continuous Reception Mode

Activation of early PDCCH decoding mode:
The activation of Early PDCCH decoding mode is performed only if:
  UE enters RRC_CONNECTED mode, and
  SINR>=earlyPdcch_SinrHigh for earlyPdcch_evaluationTime subframes Deactivation of early PDCCH decoding mode:
Early PDCCH decoding mode is deactivated once the following condition is met:
  UE leaves RRC_CONNECTED mode, or
  SINR<=earlyPdcch_SinrLow for earlyPdcch_evaluationTim subframes Metric computation:

SINR=func (SINRmain, SINRdiv) is a function providing an effective SINR based on the given receiver antenna specific SINRs, for example SINRmain from the main antenna path and SINRdiv from the diversity antenna path. An implementation of such function could be a look up table representing a mapping function, or a theoretical derived formula. Such a function can be set up based on numerical simulations or analytical studies covering typical system conditions. Examples of such function can take the minimum value between the reception paths, or the averaged value, etc.

For a better modelling of the fading channel, the effective SINR is normally a function of the SNR measured in frequency domain: eSINR=f (SINR(i,j)), where i represents the frequency and time index and j the receiver antenna.

earlyPdcch_SinrHigh is the SINR threshold for entering the early control region decoding mode, i.e. early PDCCH decoding mode in this example, while earlyPdcch_SinrLow is the SINR threshold for leaving the early PDCCH decoding mode. Both thresholds can be preconfigured according to the PDCCH decoding performance study results through numerical simulations and field test analysis. Furthermore, these thresholds can be adapted on-the-fly based on the run-time PDCCH decoding performance measurement.

B)—Early PDCCH Evaluation Criteria in the Presence C-DRX

At the beginning of each C-DRX cycle, where the time and gain acquisition occurs, the following rules shall be followed when C-DRX is configured:

Rule 1: when the baseband circuit has reported that time synchronization has been achieved, the UE shall consolidate the PDCCH decoding mode by evaluating the SINR conditions defined in basic method point A (excluding evaluation period earlyPdcch_evaluationTime).

Rule 2: when Rule 1 evaluates to true and the current SINR evaluation indicates same PDCCH decoding mode as the one stored from the previous C-DRX cycle, the UE shall maintain the PDCCH decoding mode.

Rule 3: when Rule 1 evaluates to true and the current SINR evaluation indicates a PDCCH decoding mode which differs to the one stored from the previous C-DRX cycle, the UE shall enter normal PDCCH decoding mode and evaluate the regular evaluation period.

Rule 4: when Rule 1 evaluates to false, the UE shall enter normal PDCCH decoding mode.

Rule 5: while the UE is in DRX active time, when Rule 1 evaluates to true, the UE shall evaluate the continuous reception rules defined in basic method point A.

More aggressive rules, which at the same time reduces the complexity of the algorithm:

Rule 6: When C-DRX is used according to the terminology in the standardization document 3GPP TS 36.133 version 12.7.0 "Evolved Universal Terrestrial Radio Access (E-UTRA); Requirements for support of radio resource management" and the channel coherence time is larger than 40 ms (approx. 10 Hz Doppler spread), the rules 1-4 shall not be evaluated more often than every 80 ms.

C)—PDCCH-Only Evaluation Criteria in Continuous Reception Mode

Activation of PDCCH-only decoding mode:
  UE enters RRC_CONNECTED mode, and
  After pdcchOnly_subframes where no DL assignments are addressed to the UE and no DL HARQ process is pending, and
  SINR>=pdcchOnly_SinrHigh for pdcchOnly_evaluationTime subframes.

Deactivation of PDCCH-only decoding mode:
  UE leaves RRC_CONNECTED mode, or
  DL assignment is addressed to the UE, or
  SINR<=earlyPdcch_SinrLow for pdcchOnly_evaluationTime subframes.

The basic algorithm may require lower SINR thresholds compared to the ones defined for early PDCCH decoding mode, since CRS from OFDM #0 and #4 may be used.

Nevertheless, under excellent channel conditions a more aggressive PDCCH-only decoding mode may be applied where only the CRS from OFDM #0 is used, in this case similar SINR thresholds to the one defined for early PDCCH decoding mode are valid.

D)—Evaluation Criteria in the Presence of C-DRX

The following rules shall be followed when C-DRX is configured and active.

Rule 1: while
drx-RetransmissionTimer is running; or
ContentionResolutionTimer is running; or
a PDCCH indicating a new transmission addressed to the C-RNTI of the UE has not been received after successful reception of a Random Access Response for the preamble not selected by the UE,
the UE shall not enter PDCCH-only decoding mode.

Rule 2: while
a Scheduling Request is sent on PUCCH and is pending; or
an uplink grant for a pending HARQ retransmission can occur and there is data in the corresponding HARQ buffer;
the UE shall not enter PDCCH-only decoding mode.

Rule 3: while
onDurationTimer is running; or
drx-InactivityTimer is running; and
Rule 1 condition evaluates to false,
the UE shall evaluate the regular conditions defined in basic method point C.

Rule 4: when the UE receives PDCCH subframe, the timer tracking pdcchOnly_ subframes shall be incremented Rule 5: when the UE receives the first PDCCH subframe of onDuration period, the timer tracking pdcchOnly_ subframes shall be initialized to 1

For data application with deterministic traffic patterns such as VoLTE, more aggressive management rules may be applied. The UE shall monitor activities in data bearers belonging to that application (i.e. QCI 1 and QCI 5 for Voice data and IMS signaling respectively in the case of VoLTE) and apply or substitute the following rules upon successful detection:

Rule 2 may be changed as follows:
while
a Scheduling Request is sent on PUCCH and is pending; or
an uplink grant for a pending HARQ retransmission can occur and there is data in the corresponding HARQ buffer; and Rule 1 condition evaluates to false; and
Rule 3 condition evaluates to false,
the UE shall enter PDCCH-only decoding mode.
PDCCH only in contiguous reception: when
DL SPS is configured and active, and
a DL SPS assignment is configured for the considered subframe,
then PDCCH-only decoding mode shall not be applied for the sub-frame, and
the counter pdcchOnly_ subframes shall not be reset (i.e. the counter is applied to non-SPS DL assignments only)

E)—Coexistence of PDCCH Decoding Modes

The following priorities may be followed to activate the proper PDCCH decoding mode (having Priority 1 the highest precedence):

Priority 1: PDCCH-only decoding mode by using only CRS from OFDM #0 (introduced at the end of basic algorithm, point C).
Priority 2: PDCCH-only decoding mode by using CRS from the first slot of the subframe.
Priority 3: Early PDCCH decoding mode.
Priority 4: Normal PDCCH decoding mode.

A PDCCH decoding mode is only activated once it evaluates to true its corresponding criteria.

In the following paragraphs, an advance algorithm is described as one example of the method 200 described above. The advanced algorithm is related to PDCCH decoding mode management based on PDCCH BLER estimation and applies advanced DL radio channel metrics.

To estimate BLER, effective SNR based methods like exponential effective SNR mapping (EESM), or mutual information based methods like Mutual Information Effective SNR mapping (MIESM), can be used. Such methods abstract channel conditions (e.g. frequency and time diversity, channel estimation errors, etc.) in a single core metric that reflects the equivalent AWGN channel conditions. This metric can then be mapped into BLER using look-up-tables or polynomial approximation of the BLER as function of the core metric.

In a first UE implementation this core metric may be already available while computing in-sync/out-of-sync conditions. UE may compute then additional core metrics for the multiple PDCCH-normal/only/early hypotheses. Each of these hypotheses translates in corresponding in-sync/out-of-sync conditions that can then be used to decide on the PDCCH-mode (e.g. a mode where out-of-sync is triggered will be discarded from the list of possible PDCCH-modes).

In a second UE implementation, the same core metric may be used for PDSCH performance estimation based on effective SNR of the same or different resource elements as used for PDCCH performance estimation. Multiple PDCCH-mode hypotheses may then be evaluated to determine the impact of the PDCCH-mode on PDSCH performance. This is of special relevance in scenarios like VoLTE, where only one reception per C-DRX can occur and thus PDSCH performance can be severely affected by PDCCH decoding mode.

In coexistence with DL carrier aggregation (DL CA) or Dual Connectivity, the following alternatives can be considered:

Basic algorithm: the power-saving PDCCH decoding mode may be activated only if the criteria defined above evaluates to true for each of the DL component carriers (DL CC). On the other hand, when the deactivation conditions evaluate to true to any of the DL CC, all the DL CC shall enter normal PDCCH decoding mode.

Advanced algorithm: when RF and baseband allows independent processing of each DL component carrier (DL CC), the above defined algorithms may be applied to each DL CC independently. This approach provides additional power saving, since power consumption reduction may be experienced in some of the DL CCs, while other DL CCs operate in normal PDCCH decoding mode. Similarly, the deactivation of power-saving PDCCH decoding modes may be applied independently for each DL CC.

In coexistence with dynamic reception diversity, additional conditions may be evaluated in connection to the DL radio channel metric. An exemplary implementation of the method may use a more aggressive threshold for the DL radio channel metric, when two reception antenna ports (RX AP) are active and there is low gain imbalance between them. Otherwise, the evaluation may fall back to a more conservative evaluation. Similarly, the number of RX APs and the gain imbalance between them may be used to evaluate the deactivation of the power-saving PDCCH decoding modes.

While the UE in RRC_CONNECTED mode has a strong indication (e.g. based on the results of the radio resource management (RRM) measurements configured by EUTRAN) that a cell change may be triggered by the network, the UE may disable PDCCH-only decoding mode. This action may be taken to ensure that the UE does not meet the network command triggering a cell change (e.g. Handover by means of RRC Connection Reconfiguration with mobilityControlInfo).

A further alternative is adaptation of monitoring (considering both DL traffic and DL radio channel metrics) time intervals based on C-DRX period.

While the UE is in RRC_IDLE mode and experiencing excellent DL reception signal conditions, UE may activate early PDCCH decoding mode.

The method 200 defines a new way to manage the dynamic selection of the different PDCCH decoding modes by taking into account DL traffic as well as DL radio channel metrics. The method 200 may be based on the following prerequisites: Normal PDCCH decoding mode is the default mode. PDCCH-only decoding mode is managed according to: DL assignments received in a certain time interval and DL radio channel metric deduced by the UE, based on SINR. Early PDCCH decoding mode is managed according to: DL radio channel metric deduced by the UE, based on SINR. The following priorities may be defined: priority 1 (highest) may correspond to PDCCH-only decoding, priority 2 to early PDCCH decoding and priority 3 (lowest) to normal PDCCH decoding. The mode with the highest priority may be activated providing its activation conditions evaluate to true. The evaluation criteria may be enhanced by considering the C-DRX status as well as the ongoing DL and UL activities (traffic and signaling). Additionally, the method 200 may introduce BLER as a more advanced DL radio channel metric in order to illustrate how the method can be extended.

The method 200 may address the management of the different Physical Downlink Control Channel (PDCCH, according to 3GPP TS 36.211 version 12.4.0 "Evolved Universal Terrestrial Radio Access (E-UTRA); Physical channels and modulation") decoding modes in order to minimize the UE power consumption without risking the loss of the data connection. The PDCCH decoding modes are exemplary illustrated in FIGS. 5 to 7 as described below.

Figure 3:
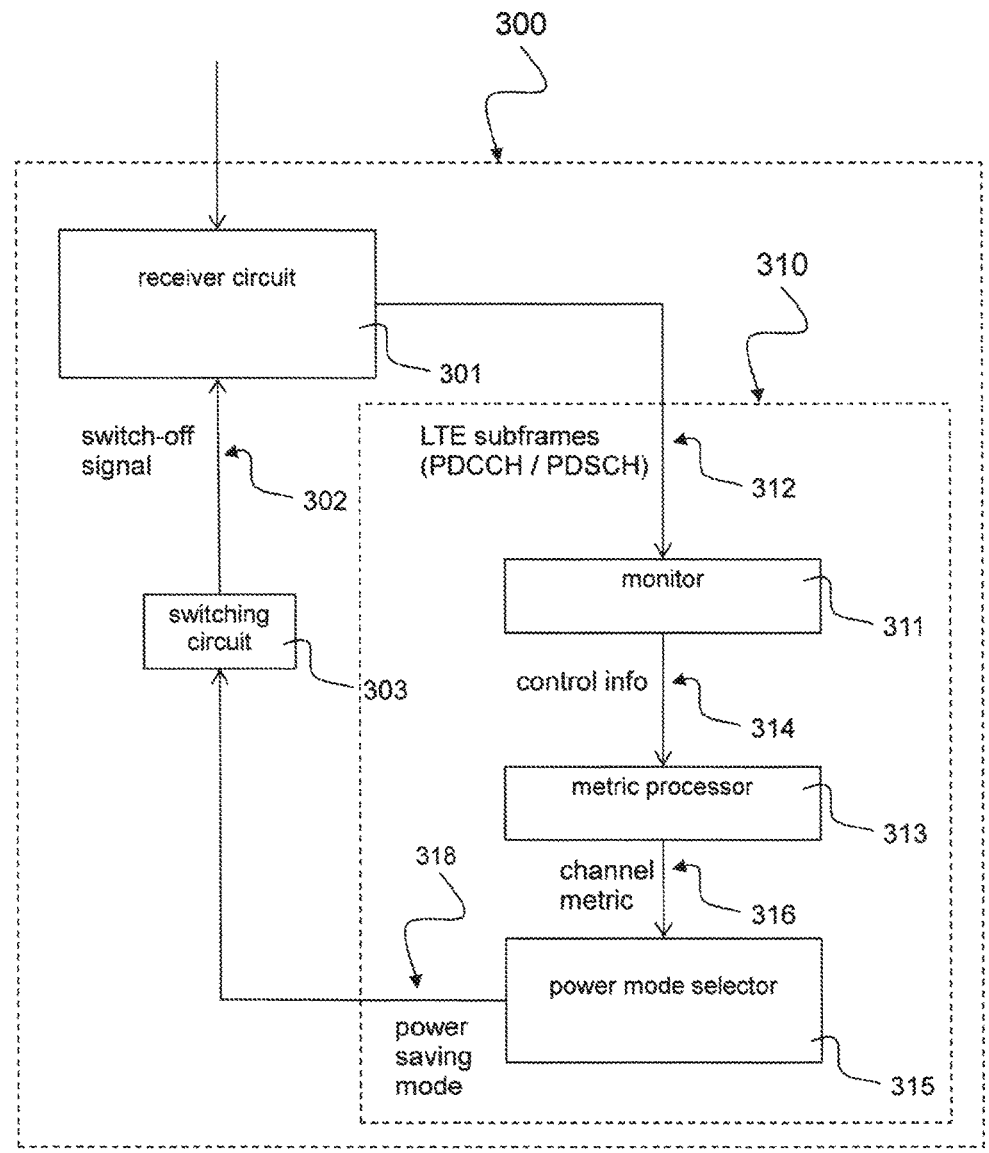
FIG. 3 schematically illustrates an exemplary radio receiver 300 with an exemplary power management controller 310.

FIG. 3 schematically illustrates an exemplary radio receiver 300 with an exemplary power management controller 310, also referred to as control region decoding mode controller 310.

The power management controller 310 includes a monitor 311, a metric processor 313 and a control region decoding mode selector 315, simply referred to as power mode selector 315.

The monitor 311 monitors control information 314 from at least one control region of at least one radio subframe of a sequence of radio subframes 312, e.g. radio subframes 501, 502, 503 as described below with respect to FIGS. 5 to 7 over a radio channel. Each radio subframe 502 includes at least one control region 504 and at least one data region 505. The metric processor 313 generates a radio channel metric 316 based on the monitored control information 314. The radio channel metric 316 indicates a quality of the radio channel. The control region decoding mode selector 315 selects a control region decoding mode 318, e.g. a first control region decoding mode "early_PDCCH" 600 as described below with respect to FIG. 6 or a second control region decoding mode "PDCCH_only" 700 as described below with respect to FIG. 7, based on the radio channel metric 316. The control region decoding mode 600, 700 indicates a scheduling for disabling reception of at least part of the at least one data region of the sequence of radio subframes as described below with respect to FIGS. 6 and 7.

The metric processor 313 may generate the radio channel metric 316 based on a signal to interference plus noise ratio (SINR) of the received sequence of radio subframes 501, 502, 503.

The metric processor 313 may generate the radio channel metric 316 based on a block error rate (BLER) of the received sequence of radio subframes 501, 502, 503.

The control region decoding mode selector 315 may select between a first control region decoding mode, e.g. early_PDCCH inhering the first power saving mode 600 as described below with respect to FIG. 6, a second control region decoding mode, e.g. PDCCH_only inhering the second power saving mode 700 as described below with respect to FIG. 7 and a normal control region decoding mode, e.g. normal_PDCCH inhering the normal power mode 500 as described below with respect to FIG. 5.

The first control region decoding mode early_PDCCH 600 indicates a scheduling for disabling reception of the at least one data region after decoding at least part of the at least one control region.

The second control region decoding mode PDCCH_only 700 indicates a scheduling for disabling reception of the at least one data region if the control information indicates an absence of user data in the at least one data region.

The normal control region decoding mode normal_PDCCH 500 indicates a normal operation of the radio receiver in which receiving the at least one data region and the at least one control region is enabled.

The radio receiver 300 includes a receiver circuit 301, the monitor 311, the metric processor 313 and the control region decoding mode selector 315.

The receiver circuit 301 receives a sequence of radio subframes, e.g. radio subframes 501, 502, 503 as described below with respect to FIGS. 5 to 7, over a radio channel. Each radio subframe includes at least one control region and at least one data region, e.g. as described above with respect to FIG. 2.

The radio receiver 300 may include a switching circuit 303 that may switch-off receiving at least part of the at least one data region of the sequence of radio subframes in the receiver circuit 301 according to the selected control region decoding mode.

FIG. 4 schematically illustrates an exemplary mobile device 400 including a baseband processor chip 401 and a RF transceiver chip 403 and further components.

The baseband processor chip 401 communicates with the RF transceiver chip 403 via a digital RF interface 402. The mobile device 400 further includes a power amplifier 409 and an antenna 411 which are coupled to the transceiver chip 403 for receiving and/or transmitting RF signal. The mobile device 400 may further include a SDRAM 415 coupled to the baseband processor chip 401 and a Flash memory 417 coupled to the baseband processor chip 401. The mobile device 400 further includes an application of a user, e.g. a touch-screen or a keyboard or a microphone or load-speaker etc. that are coupled via a user interface 404 to the baseband processor 401. The baseband processor 401 represents a system-on-chip (SoC) including a controlling circuit for controlling communication tasks and a baseband interface 407 for receiving/transmitting data from/to the RF transceiver 403.

The baseband processor chip 401 further includes a power management controller 310, also referred to as control region decoding mode controller 310 as described above with respect to FIG. 3 for controlling control region decoding modes 318 of the baseband processor 401 as described above with respect to FIGS. 2 and 3. The baseband processor chip 401 further includes a switching circuit for disabling reception of at least part of the data region of the data subframes at the BB interface 407 received by the RF transceiver 403 over the digital RF interface 402. For realizing this power management, the switching circuit 303 may send a switch-off signal 302 to the BB interface depending on the power saving mode 318 received from the power management controller. When the baseband (BB) processor chip 401 decides to stop the reception, not just the BB processor chip 401 is saving power but also the RF transceiver 403.

FIG. 5 illustrates a timing diagram of a normal PDCCH decoding mode with the corresponding power saving mode 500 applied to an LTE subframe 502.

In LTE a 1 ms downlink radio subframe 502 consists of 14 OFDM symbols (with normal cyclic prefix). The PDCCH (Physical Downlink Control Channel) 504, staying in the control region of the subframe, is always transmitted in the first symbols of a DL subframe 502 and carries Downlink Control Information (DCI). The PDCCH 504 further carries a cell-specific reference signal (CRS) 507 that may be used for channel estimation. The exact number of OFDM symbols carrying the PDCCH 504 is dynamically chosen by the eNodeB and is signaled in the PCFICH (Physical Control Format Indicator Channel). For cell bandwidth (BW)>=3 MHz it can be transmitted in the first up to 3 symbols; for BW=1.4 MHz in the first up to 4 symbols, respectively. The following, remaining symbols of the subframe contain the PDSCH (Physical Downlink Shared Channel) 505, also called data region of the subframe, which carries user data and higher layer control messages. Timing details can be seen in FIG. 5.

The DCI on the PDCCH 504 includes DL grant information, i.e. whether there is data for the UE in the following PDSCH symbols 505 of the subframe 502 or not. The sequence of PDCCH 504 and PDSCH 505 was chosen intentionally to allow power saving on the UE side: if there is no DL grant on PDCCH 504 the Rx path can be turned off during the PDSCH region 505 as described below with respect to FIGS. 6 and 7 for the two different power saving modes. This is of particular relevance in RRC (Radio Resource Control) connected state, where the UE has to continuously monitor the PDCCH 504, except for connected mode DRX (Discontinuous Receive).

For the decoding of PDCCH in subframe 502, the UE may employ cell-specific reference signals (CRS) from previous subframes as well as from subframe 502. No assumption is taken regarding the allocation of DL assignments nor in terms of downlink (DL) radio channel quality, being fully 3GPP compliant. In this mode, no direct power saving in connection to PDCCH decoding is conceived, since all OFDM symbols within the subframe are received.

FIG. 6 illustrates a timing diagram of a first PDCCH decoding mode with the first power saving mode 600 applied to an LTE subframe 502.

For the decoding of PDCCH in subframe 502, the UE may employ only the CRS 507 belonging to the OFDM symbol #0 in subframe 502 in order to initiate as soon as possible the decoding 606 of PDCCH 504. This operation mode may be activated under excellent signal conditions, where the PDCCH requirements defined by Radio Resource Management (RRM) specifications according to 3GPP TS 36.133 version 12.7.0 "Evolved Universal Terrestrial Radio Access (E-UTRA); Requirements for support of radio resource management" are fulfilled, being 3GPP compliant. No assumption regarding the allocation of DL assignments is required, since the power down of the baseband (BB) and radio-frequency (RF) circuitry is scheduled reactively after the decoding 606 of the PDCCH 504.

FIG. 7 illustrates a timing diagram of a second PDCCH decoding mode with the second power saving mode 700 applied to an LTE subframe 502.

For the decoding of PDCCH 504 in subframe 502, same comments as for mode 600 described above with respect to FIG. 6 may apply. Note that under slightly worse channel conditions CRS 707 from OFDM #4 may be used, segments 702 may be discarded. However, the suspension of the sample collection may be proactively scheduled upon reception of the last OFDM symbol carrying PDCCH 504, under the assumption that no DL assignment is allocated in the current subframe 502. The content of the PDCCH 504 may be available at a time similar to normal PDCCH decoding mode. Nevertheless, when mode 700 is active, the RF circuit can be set to sleep after the last OFDM symbol carrying PDCCH 504 is received by the BB sub-system which introduces a substantial power saving in the UE, see segments "Power Down" 701 and "Extended Power Down" 702 in the figure.

Applying the management of the PDCCH decoding modes according to this disclosure allows the UE to minimize its power consumption without dismissing the channel conditions experienced by the device.

In an exemplary Voice over LTE (VoLTE) scenario, where a speech activity of 100% in uplink and in downlink is assumed that occurs in double talk as well as in noisy surroundings, the combined utilization of early control region decoding mode 600 and control region only decoding mode 700 allows for power savings of about 20%. In case of a speech activity of 40% talk, 40% listen, 20% silence, the expected savings are slightly reduced to about 15%.

The disclosed PDCCH decoding mode management method, in addition to longer C-DRX cycle, may allow larger power saving under bursty traffic pattern such as web browsing. As such, the use-case provided above is merely illustrative, rather than restrictive.

EXAMPLES

The following examples pertain to further embodiments. Example 1 is a method for power management in a radio receiver, the method comprising: receiving a sequence of radio subframes over a radio channel, each radio subframe comprising at least one control region and at least one data region; monitoring control information from at least one control region of at least one radio subframe; generating a channel metric indicating a quality of the radio channel; and selecting a control region decoding mode based on the channel metric, the control region decoding mode indicating a scheduling for disabling reception of the at least one data region of the sequence of radio subframes.

In Example 2, the subject matter of Example 1 can optionally include: disabling reception of at least one data region of the sequence of radio subframes according to the selected control region decoding mode.

In Example 3, the subject matter of Example 1 can optionally include: generating the channel metric based on at least one cell specific reference signal received in at least one control region of at least one radio subframe.

In Example 4, the subject matter of any one of Examples 1-3 can optionally include that a first control region decoding mode indicates a scheduling for disabling reception of at least part of the at least one data region after decoding at least one control region.

In Example 5, the subject matter of Example 4 can optionally include that a second control region decoding mode indicates a scheduling for disabling reception of the at least one data region before a knowledge from the control information indicating an absence or presence of user data in the at least one data region.

In Example 6, the subject matter of Example 5 can optionally include that a normal control region decoding mode indicates a scheduling for a normal operation in which receiving the at least one data region is enabled.

In Example 7, the subject matter of Example 6 can optionally include: assigning respective priorities to the control region decoding modes, wherein a priority assigned to the second control region decoding mode (PDCCH_only) is higher than a priority assigned to the first control region decoding mode (early_PDCCH) and the priority assigned to the first control region decoding mode (early_PDCCH) is higher than a priority of the normal control region decoding mode (normal_PDCCH).

In Example 8, the subject matter of Example 6 or 7 can optionally include: generating the channel metric based on a signal to interference plus noise ratio.

In Example 9, the subject matter of Example 8 can optionally include: selecting the first control region decoding mode (early_PDCCH) if the following conditions are met: the radio receiver is in continuous reception mode, the radio receiver enters RRC_CONNECTED mode, and the signal to interference plus noise ratio is above a first threshold (earlyPdcch_SinrHigh) for a first threshold number (earlyPdcch_evaluationTime) of successive radio subframes of the sequence of radio subframes.

In Example 10, the subject matter of Example 9 can optionally include: maintaining the first control region decoding mode (early_PDCCH) if the radio receiver enters a connected mode discontinuous reception (C-DRX) state in RRC_CONNECTED mode and if the signal to interference plus noise ratio is above the first threshold (earlyPdcch_SinrHigh).

In Example 11, the subject matter of Example 9 or 10 can optionally include: scheduling a transition from the first control region decoding mode (early_PDCCH) to the normal control region decoding mode (normal_PDCCH) if the signal to interference plus noise ratio is below a second threshold (earlyPdcch_SinrLow) for the first threshold number (earlyPdcch_evaluationTime) of successive radio subframes of the sequence of radio subframes or if the radio receiver leaves the RRC_CONNECTED mode.

In Example 12, the subject matter of any one of Examples 8-11 can optionally include: selecting the second control region decoding mode (PDCCH_only) if the following conditions are met: the radio receiver is in continuous reception mode, the radio receiver enters RRC_CONNECTED mode, and the signal to interference plus noise ratio is above a third threshold (pdcchOnly_SinrHigh) for a second threshold number (pdcchOnly_evaluationTime) of successive radio subframes of the sequence of radio subframes.

In Example 13, the subject matter of Example 12 can optionally include: selecting the second control region decoding mode (PDCCH_only) if the following further condition is met: after a third threshold number (pdcchOnly_subframes) of successive radio subframes no downlink assignments are addressed to the radio receiver.

In Example 14, the subject matter of Example 13 can optionally include: selecting the second control region decoding mode (PDCCH_only) if the following further condition is met: after the third threshold number (pdcchOnly_subframes) of successive radio subframes no downlink hybrid automatic repeat request (HARQ) process is pending to be received by the radio receiver.

In Example 15, the subject matter of any one of Examples 12-14 can optionally include: scheduling a transition from the second control region decoding mode (PDCCH_only) to the normal control region decoding mode (normal_PDCCH) if the signal to interference plus noise ratio is below a fourth threshold (earlyPdcch_SinrLow) for the second threshold number (PdcchOnly_evaluationTime) of successive radio subframes of the sequence of radio subframes or if the radio receiver leaves the RRC_CONNECTED mode or if a downlink assignment is addressed to the radio receiver.

In Example 16, the subject matter of any one of Examples 1-15 can optionally include: generating the channel metric based on a block error rate (BLER) computed over a sequence of the received radio subframes.

In Example 17, the subject matter of Example 16 can optionally include: estimating SNR based on abstracting channel conditions with one of exponential effective SNR mapping (EESM) or mutual information effective SNR mapping (MIESM) and used the estimated metric to mapped to BLER using look-up-tables or polynomial approximation.

Example 18 is a power management controller for a radio receiver, the power management controller comprising: a monitor, configured to monitor control information from at least one control region of at least one radio subframe of a sequence of radio subframes received over a radio channel, wherein each radio subframe comprises at least one control region and at least one data region; a metric processor configured to generate a channel metric based on the monitored control information, the channel metric indicating a quality of the radio channel; and a control region decoding mode selector configured to select a control region decoding mode based on the channel metric, wherein the control region decoding mode indicates a scheduling for disabling reception of at least part of the at least one data region of the sequence of radio subframes.

In Example 19, the subject matter of Example 18 can optionally include that the metric processor is configured to generate the channel metric based on a signal to interference plus noise ratio (SINR) of the received sequence of radio subframes.

In Example 20, the subject matter of Example 18 can optionally include that the metric processor is configured to generate the channel metric based on a block error rate (BLER) computed over a sequence of received radio subframes.

In Example 21, the subject matter of any one of Examples 18-20 can optionally include that the control region decoding mode selector is configured to select between a second control region decoding mode (PDCCH_only), a first control region decoding mode (early_PDCCH) and a normal control region decoding mode (normal_PDCCH), that the second control region decoding mode (PDCCH_only) indicates a scheduling for disabling reception of the at least one data region before a knowledge from the control information indicating an absence or presence of user data in the at least one data region, that the first control region decoding mode (early_PDCCH) indicates a scheduling for disabling reception of at least part of the at least one data region after decoding at least part of the at least one data region, and that the normal control region decoding mode (normal_PDCCH) indicates a normal operation of the radio receiver in which receiving the at least one data region and the at least one control region is enabled.

Example 22 is a radio receiver, comprising: a receiver circuit configured to receive a sequence of radio subframes over a radio channel, each radio subframe comprising at least one control region and at least one data region; a monitor, configured to monitor control information from at least one control region of at least one radio subframe of the sequence of radio subframes; a metric processor configured to generate a channel metric based on the monitored control region, the channel metric indicating a quality of the radio channel; and a control region decoding mode selector configured to select a control region decoding mode based on the channel metric, wherein the control region decoding mode indicates a scheduling for disabling reception of at least part of the at least one data region of the sequence of radio subframes.

In Example 23, the subject matter of Example 22 can optionally include: a switching circuit configured to switch-off receiving at least part of the at least one data region of the sequence of radio subframes in the receiver circuit according to the selected control region decoding mode.

In Example 24, the subject matter of any one of Examples 22-23 can optionally include that the control region decoding selector is configured to select between a second control region decoding mode, a first control region decoding mode and a normal control region decoding mode, that the second control region decoding mode indicates a scheduling for disabling reception of the at least one data region before a knowledge from the control information indicating an absence or presence of user data in the at least one data region, that the first control region decoding mode indicates a scheduling for disabling reception of at least part of the at least one data region after decoding at least part of the at least one data region, and that the normal control region decoding mode indicates a normal operation of the radio receiver in which receiving the at least one data region and the at least one control region is enabled.

Example 25 is a computer readable medium on which computer instructions are stored which when executed by a computer, cause the computer to perform the method of one of Examples 1 to 17.

Example 26 is a device for power management in a radio receiver, the device comprising: means for receiving a sequence of radio subframes over a radio channel, each radio subframe comprising at least one control region and at least one data region; means for monitoring control information from at least one control region of at least one radio subframe; generating a channel metric based on the monitored control information, the channel metric indicating a quality of the radio channel; and means for selecting a control region decoding mode based on the channel metric, the control region decoding mode indicating a scheduling for disabling reception of at least part of the at least one data region of the sequence of radio subframes.

In Example 27, the subject matter of Example 26 can optionally include: means for disabling reception of at least part of the at least one data region of the sequence of radio subframes according to the selected control region decoding mode.

In Example 28, the subject matter of Example 26 can optionally include: means for generating the channel metric based on at least one cell specific reference signal received in at least one control region of at least one radio subframe.

In Example 29, the subject matter of any one of Examples 26-28 can optionally include that a first control region decoding mode (early_PDCCH) indicates a scheduling for disabling reception of at least part of the at least one data region after decoding at least one control region.

In Example 30, the subject matter of Example 29 can optionally include that a second control region decoding mode (PDCCH_only) indicates a scheduling for disabling reception of the at least one data region before a knowledge from the control information indicating an absence or presence of user data in the at least one data region.

In Example 31, the subject matter of Example 30 can optionally include that a normal control region decoding mode (normal_PDCCH) indicates a scheduling for a normal operation in which receiving the at least one data region is enabled.

In Example 32, the subject matter of Example 31 can optionally include: means for assigning respective priorities to the control region decoding modes, wherein a priority assigned to the second control region decoding mode (PDCCH_only) is higher than a priority assigned to the first control region decoding mode (early_PDCCH) and the priority assigned to the first control region decoding mode (early_PDCCH) is higher than a priority of the normal control region decoding mode (normal_PDCCH).

In Example 33, the subject matter of Example 31 or 32 can optionally include: means for generating the channel metric based on a signal to interference plus noise ratio. The channel metric may be SINR based or it may be any other type of metric.

In Example 34, the subject matter of Example 33 can optionally include: means for selecting the first control region decoding mode (early_PDCCH) if the following conditions are met: the radio receiver is in continuous reception mode, the radio receiver enters RRC_CONNECTED mode, and the signal to interference plus noise ratio is above a first threshold (earlyPdcch_SinrHigh) for a first threshold number (earlyPdcch_evaluationTime) of successive radio subframes of the sequence of radio subframes.

In Example 35, the subject matter of Example 34 can optionally include: means for maintaining the first control region decoding mode (early_PDCCH) if the radio receiver enters a connected mode discontinuous reception (C-DRX) state in RRC_CONNECTED mode and if the signal to interference plus noise ratio is above the first threshold (earlyPdcch_SinrHigh).

In Example 36, the subject matter of Example 34 or 35 can optionally include: means for scheduling a transition from the first control region decoding mode (early_PDCCH) to the normal control region decoding mode (normal_PDCCH) if the signal to interference plus noise ratio is below a second threshold (earlyPdcch_SinrLow) for the first threshold number (earlyPdcch_evaluationTime) of successive radio subframes or if the radio receiver leaves the RRC_CONNECTED mode.

In Example 37, the subject matter of any one of Examples 33-36 can optionally include: means for selecting the second control region decoding mode (PDCCH_only) if the following conditions are met: the radio receiver is in continuous reception mode, the radio receiver enters RRC_CONNECTED mode, and the signal to interference plus noise ratio is above a third threshold (pdcchOnly_SinrHigh) for a second threshold number (pdcchOnly_evaluationTime) of successive radio subframes of the sequence of radio subframes.

In Example 38, the subject matter of Example 37 can optionally include: means for selecting the second control region decoding mode (PDCCH_only) if the following further condition is met: after a third threshold number (pdcchOnly_subframes) of successive radio subframes no downlink assignments are addressed to the radio receiver.

In Example 39, the subject matter of Example 38 can optionally include: means for selecting the second control region decoding mode (PDCCH_only) if the following further condition is met: after the third threshold number (pdcchOnly_subframes) of successive radio subframes no downlink hybrid automatic repeat request (HARQ) process is pending in the radio receiver.

In Example 40, the subject matter of any one of Examples 37-39 can optionally include: means for scheduling a transition from the second control region decoding mode (PDCCH_only) to the normal control region decoding mode (normal_PDCCH) if the signal to interference plus noise ratio is below a fourth threshold (earlyPdcch_SinrLow) for the second threshold number (PdcchOnly_evaluationTime) of successive radio subframes of the sequence of radio subframes or if the radio receiver leaves the RRC_CONNECTED mode or if a downlink assignment is addressed to the radio receiver.

In Example 41, the subject matter of any one of Examples 26-40 can optionally include: means for generating the channel metric based on a block error rate (BLER) computed over a sequence of the received radio subframe.

In Example 42, the subject matter of Example 41 can optionally include: means for estimating SNR based on abstracting channel conditions with one of exponential effective SNR mapping (EESM) or mutual information effective SNR mapping (MIESM) and used the estimated metric to mapped to BLER using look-up-tables or polynomial approximation.

Example 43 is a power management controller circuit for a radio receiver, the power management controller circuit comprising: a monitor circuit, configured to monitor control information from at least one control region of at least one radio subframe of a sequence of radio subframes received over a radio channel, wherein each radio subframe comprises at least one control region and at least one data region; a metric processor circuit configured to generate a channel metric based on the monitored control information, the channel metric indicating a quality of the radio channel; and a control region decoding selector circuit configured to select a control region decoding mode based on the channel metric, wherein the control region decoding mode indicates a scheduling for disabling reception of at least part of the at least one data region of the sequence of radio subframes.

In Example 44, the subject matter of Example 43 can optionally include that the metric processor circuit is configured to generate the channel metric based on a signal to interference plus noise ratio (SINR) of the received sequence of radio subframes. The channel metric may be based on SINR or other metrics.

In Example 45, the subject matter of Example 43 can optionally include that the metric processor circuit is configured to generate the channel metric based on a block error rate (BLER) of the received sequence of radio subframes.

In Example 46, the subject matter of any one of Examples 43-45 can optionally include that the control region decoding selector circuit is configured to select between a second control region decoding mode (PDCCH_only), a first control region decoding mode (early_PDCCH) and a normal control region decoding mode (normal_PDCCH), that the second control region decoding mode (PDCCH_only) indicates a scheduling for disabling reception of the at least one data region before a knowledge from the control information indicating an absence or presence of user data in the at least one data region, that the first control region decoding mode (early_PDCCH) indicates a scheduling for disabling reception of at least part of the at least one data region after decoding at least part of the at least one data region, and that the normal control region decoding mode (normal_PDCCH) indicates a normal operation of the radio receiver in which receiving the at least one data region and at least one control region is enabled.

Example 47 is a radio receiver system, comprising: a receiver subsystem configured to receive a sequence of radio subframes over a radio channel, each radio subframe comprising at least one control region and at least one data region; a monitor subsystem, configured to monitor control information from at least one control region of at least one radio subframe of the sequence of radio subframes; a metric processor subsystem configured to generate a channel metric based on the monitored control information, the channel metric indicating a quality of the radio channel; and a control region decoding selector subsystem configured to select a control region decoding mode based on the channel metric, wherein the control region decoding mode indicates a scheduling for disabling reception of at least part of the at least one data region of the sequence of radio subframes.

In Example 48, the subject matter of Example 47 can optionally include: a switching circuit subsystem configured to switch-off receiving at least part of the at least one data region of the sequence of radio subframes in the receiver circuit according to the selected control region decoding mode.

In Example 49, the subject matter of any one of Examples 47-48 can optionally include that the control region decoding mode selector subsystem is configured to select between a second control region decoding mode (PDCCH_only), a first control region decoding mode (early_PDCCH) and a normal control region decoding mode (normal_PDCCH), that the second control region decoding mode (PDCCH_only) indicates a scheduling for disabling reception of the at least one data region before a knowledge from the control information indicating an absence or presence of user data in the at least one data region, that the first control region decoding mode (early_PDCCH) indicates a scheduling for disabling reception of at least part of the at least one data region after decoding at least part of the at least one data region, and that the normal control region decoding mode (normal_PDCCH) indicates a normal operation of the radio receiver system in which receiving the at least one data region and the at least one control region is enabled. Early PDCCH means that the data region is completed received only if a DL assignment was detected in the control region.

In Example 50, the subject matter of any one of Examples 22-24 can optionally include that the metric processor is further configured to generate the channel metric based on at least one of the following conditions: an activity of at least two reception antenna ports of the radio receiver and a gain imbalance between the at least two reception antenna ports, a number of reception antenna ports of the radio receiver and a gain imbalance between the reception antenna ports, an indication that a cell change is received, adaptation of monitoring time intervals based on a C-DRX period, a quality of downlink reception when the radio receiver is in RRC_IDLE mode.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for power management in a radio receiver, the method comprising:
receiving a sequence of radio subframes over a radio channel, each radio subframe of the sequence of radio subframes comprising at least one control region and at least one data region;
monitoring control information from at least one control region of at least one radio subframe;
generating a channel metric based on the monitored control information, the channel metric indicating a quality of the radio channel; and
selecting a power saving mode based on the channel metric, the power saving mode indicating a scheduling to disable-receiving at least part of the at least one data region included in the sequence of radio subframes by switching off one or more portions of the radio receiver.

2. The method of claim 1, comprising:
switching off the one or more portions of the radio receiver to disable receiving at least part of the at least one data region included in the sequence of radio subframes according to the selected power saving mode.

3. The method of claim 1, comprising:
generating the channel metric based on at least one cell specific reference signal received in at least one control region of at least one radio subframe.

4. The method of claim 1, wherein a first power saving mode indicates a scheduling for switching off the one or more portions of the radio receiver to disable receiving the at least one data region after decoding at least part of the at least one control region.

5. The method of claim 4, wherein a second power saving mode indicates a scheduling for switching off the one or more portions of the radio receiver to disable receiving the at least one data region if the control information indicates an absence of user data in the at least one data region.

6. The method of claim 5, wherein a normal power mode indicates a scheduling for a normal operation in which the one or more portions of the radio receiver is switched on to receive the at least one data region.

7. The method of claim 6, comprising:
assigning respective priorities to the power saving modes, wherein a priority assigned to the second power saving mode is higher than a priority assigned to the first power saving mode and the priority assigned to the first power saving mode is higher than a priority of the normal power mode.

8. The method of claim 6, comprising:
generating the channel metric based on a signal to interference plus noise ratio.

9. The method of claim 8, comprising:
selecting the first power saving mode if the following conditions are met:
the radio receiver is in a continuous reception mode,
the radio receiver enters an RRC_CONNECTED mode, and
the signal to interference plus noise ratio is above a first threshold for a first threshold number of successive radio subframes of the sequence of radio subframes.

10. The method of claim 9, comprising:
maintaining the first power saving mode if the radio receiver enters a connected discontinuous reception (C-DRX) state in the RRC_CONNECTED mode and if the signal to interference plus noise ratio is above the first threshold.

11. The method of claim 9, comprising:
scheduling a transition from the first power saving mode to the normal power mode if the signal to interference plus noise ratio is below a second threshold for the first threshold number of successive radio subframes of the sequence of radio subframes or if the radio receiver leaves the RRC_CONNECTED mode.

12. The method of claim 8, comprising:
selecting the second power saving mode if the following conditions are met:
the radio receiver is in a continuous reception mode,
the radio receiver enters an RRC_CONNECTED mode, and
the signal to interference plus noise ratio is above a third threshold for a second threshold number of successive radio subframes of the sequence of radio subframes.

13. The method of claim 12, comprising:
selecting the second power saving mode if the following further condition is met:
after a third threshold number of successive radio subframes, no downlink assignments are addressed to the radio receiver.

14. The method of claim 13, comprising:
selecting the second power saving mode if the following further condition is met:
after the third threshold number of successive radio subframes no downlink hybrid automatic repeat request (HARQ) process is pending in the radio receiver.

15. The method of claim 12, comprising:
scheduling a transition from the second power saving mode to the normal power mode if the signal to interference plus noise ratio is below a fourth threshold for the second threshold number of successive radio subframes of the sequence of radio subframes, if the radio receiver leaves the RRC_CONNECTED mode, or if a downlink assignment is addressed to the radio receiver.

16. The method of claim 1, comprising:
generating the channel metric based on a block error rate (BLER) of the received sequence of radio subframes.

17. The method of claim 16, comprising:
generating the BLER based on one of exponential effective SNR mapping (EESM) or mutual information effective SNR mapping (MIESM).

18. A power management controller for a radio receiver, the power management controller comprising:
a first processor component configured to monitor control information from at least one control region of at least one radio subframe of a sequence of radio subframes received over a radio channel, wherein each radio subframe of the sequence of radio subframes comprises at least one control region and at least one data region;
a second processor component configured to generate a channel metric based on the monitored control information, the channel metric indicating a quality of the radio channel; and
a third processor component configured to select a power saving mode based on the channel metric,
wherein the power saving mode indicates a scheduling to disable receiving at least part of the at least one data region included in the sequence of radio subframes by switching off one or more portions of the radio receiver.

19. The power management controller of claim 18,
wherein the second processor component is configured to generate the channel metric based on a signal to interference plus noise ratio (SINR) of the received sequence of radio subframes.

20. The power management controller of claim 18,
wherein the second processor component is configured to generate the channel metric based on a block error rate (BLER) of the received sequence of radio subframes.

21. The power management controller of claim 18, wherein:
the third processor component is configured to select between a second power saving mode, a first power saving mode and a normal power mode,
the second power saving mode indicates a scheduling for switching off the one or more portions of the radio receiver to disable receiving the at least one data region if the control information indicates an absence of user data in the at least one data region,
the first power saving mode indicates a scheduling for switching off the one or more portions of the radio receiver to disable receiving the at least one data region after decoding at least part of the at least one data region, and the normal power mode indicates a normal operation of the radio receiver in which the one or more portions of the radio receiver is switched on to receive the at least one data region.

22. A radio receiver, comprising:

a receiver circuit configured to receive a sequence of radio subframes over a radio channel, each radio subframe of the sequence of radio subframes comprising at least one control region and at least one data region; and one or more processors configured to:
  monitor control information from at least one control region of at least one radio subframe of the sequence of radio subframes;
  generate a channel metric based on the monitored control information, the channel metric indicating a quality of the radio channel; and select a power saving mode based on the channel metric, wherein the power saving mode indicates a scheduling to disable receiving at least part of the at least one data region included in the sequence of radio subframes by switching off one or more portions of the receiver circuit.

23. The radio receiver of claim 22, comprising:

a switching circuit configured to switch off the one or more portions of the receiver circuit to disable receiving at least part of the at least one data region of the sequence of radio subframes according to the selected power saving mode.

24. The radio receiver of claim 22, wherein:

the one or more processors are further configured to select between a second power saving mode, a first power saving mode, and a normal power mode, the second power saving mode indicates a scheduling for switching off the one or more portions of the receiver circuit to disable receiving the at least one data region if the control information indicates an absence of user data in the at least one data region, the first power saving mode indicates a scheduling for switching off the one or more portions of the receiver circuit to disable receiving the at least one data region after decoding at least part of the at least one data region, and the normal power mode indicates a normal operation of the radio receiver in which the one or more portions of the receiver circuit is switched-on to receive the at least one data region.

* * * * *